United States Patent
Gneuss et al.

(10) Patent No.: US 10,906,215 B2
(45) Date of Patent: Feb. 2, 2021

(54) METHOD FOR PRODUCING A FOAMED BODY BY EXTRUSION AND EXTRUSION DEVICE FOR PRODUCING A FOAMED BODY

(71) Applicant: Gneuss GmbH, Bad Oeynhausen (DE)

(72) Inventors: Detlef Gneuss, Bad Oeynhausen (DE); Stephan Gneuss, Bad Oeynhausen (DE); Daniel Gneuss, Charlotte, NC (US); Frank Van Lück, Kaarst (DE)

(73) Assignees: GNEUSS GMBH, Bad Oeynhausen (DE); Frank Van Luck, Kaarst (DE)

( * ) Notice: Subject to any disclaimer, the term of this patent is extended or adjusted under 35 U.S.C. 154(b) by 782 days.

(21) Appl. No.: 14/890,690

(22) PCT Filed: Apr. 28, 2014

(86) PCT No.: PCT/EP2014/058633
§ 371 (c)(1),
(2) Date: Nov. 12, 2015

(87) PCT Pub. No.: WO2014/183984
PCT Pub. Date: Nov. 20, 2014

(65) Prior Publication Data
US 2016/0101546 A1  Apr. 14, 2016

(30) Foreign Application Priority Data
May 14, 2013  (DE) .......... 10 2013 008 201

(51) Int. Cl.
*B29C 44/00* (2006.01)
*B29C 44/34* (2006.01)
(Continued)

(52) U.S. Cl.
CPC .......... *B29C 44/3415* (2013.01); *B29B 7/485* (2013.01); *B29C 44/507* (2016.11);
(Continued)

(58) Field of Classification Search
CPC ... B29C 44/507; B29C 44/3415; B29C 44/60; B29C 47/0042; B29C 47/366;
(Continued)

(56) References Cited

U.S. PATENT DOCUMENTS 3,221,369 A  12/1965  Vesilind
3,287,477 A  11/1966  Vesilind
(Continued)

FOREIGN PATENT DOCUMENTS

DE  3712749  7/1988
DE  4001988  10/1990
(Continued)

OTHER PUBLICATIONS

Non Final Office Action for U.S. Appl. No. 14/890,999, dated Dec. 13, 2017, 20 pages.
(Continued)

*Primary Examiner* — Seyed Masoud Malekzadeh
(74) *Attorney, Agent, or Firm* — RatnerPrestia (57) ABSTRACT

A method and an extrusion device for producing a foamed body. A plastics melt is produced inside the casing of a first extruder. The plastics melt is conveyed to an outlet die of a second extruder. The conveyed plastics melt has a foaming agent and expands after being fed through the outlet die. Before the plastics melt is fed through the outlet die, variations in temperature between different radial positions over the cross-section of the plastics melt are reduced by an extruder screw device which has a number of screw spindles distributed around the periphery. The plastics melt which is thus thermally homogeneous is fed through the outlet die.

5 Claims, 2 Drawing Sheets

(51) Int. Cl.

| | |
|---|---|
| *B29C 48/00* | (2019.01) |
| *B29C 48/82* | (2019.01) |
| *B29C 48/385* | (2019.01) |
| *B29C 48/435* | (2019.01) |
| *B29B 7/48* | (2006.01) |
| *B29C 44/60* | (2006.01) |
| *B29C 44/50* | (2006.01) |
| *B29C 48/80* | (2019.01) |
| *B29C 48/43* | (2019.01) |
| *B29C 48/44* | (2019.01) |
| *B29K 101/12* | (2006.01) |
| *B29C 48/07* | (2019.01) |
| *B29C 48/375* | (2019.01) |
| *B29K 105/04* | (2006.01) |

(52) U.S. Cl.
CPC .......... *B29C 44/60* (2013.01); *B29C 48/0012* (2019.02); *B29C 48/385* (2019.02); *B29C 48/43* (2019.02); *B29C 48/435* (2019.02); *B29C 48/44* (2019.02); *B29C 48/82* (2019.02); *B29C 48/832* (2019.02); *B29C 48/834* (2019.02); *B29B 7/487* (2013.01); *B29C 48/07* (2019.02); *B29C 48/388* (2019.02); *B29K 2101/12* (2013.01); *B29K 2105/04* (2013.01); *B29K 2995/0045* (2013.01)

(58) Field of Classification Search
CPC ..... B29C 47/408; B29C 47/42; B29C 47/805; B29C 47/822; B29C 47/825; B29C 47/0019; B29C 47/368; B29C 48/832; B29C 48/43; B29C 48/82; B29C 48/834; B29C 48/435; B29C 48/385; B29C 48/0012; B29C 48/44; B29C 48/388; B29C 48/07; B29B 7/485; B29B 7/487
See application file for complete search history.

(56) References Cited

U.S. PATENT DOCUMENTS

| | | | | |
|---|---|---|---|---|
| 3,787,542 | A | | 1/1974 | Gallagher et al. |
| 3,850,414 | A | | 11/1974 | Scharer |
| 4,268,176 | A | * | 5/1981 | Muller ............... B29B 7/485 366/83 |
| 4,289,409 | A | * | 9/1981 | Brand ............... B29C 48/67 366/83 |
| 4,746,478 | A | * | 5/1988 | Fujisaki ............ B29C 44/3442 264/53 |
| 4,857,390 | A | | 8/1989 | Allen et al. |
| 5,106,198 | A | * | 4/1992 | Muller ............... B29B 7/485 366/75 |
| 5,215,764 | A | * | 6/1993 | Davis ............... B29C 45/60 425/208 |
| 5,902,529 | A | | 5/1999 | Ishikawa et al. |
| 6,005,013 | A | | 12/1999 | Suh et al. |
| 6,062,718 | A | | 5/2000 | Fogarty |
| 6,074,084 | A | * | 6/2000 | Kolossow ......... B29C 47/1063 366/144 |
| 7,040,798 | B2 | * | 5/2006 | Innerebner ............ B29B 7/485 366/76.3 |
| 7,080,935 | B2 | * | 7/2006 | Innerebner ............ B29C 48/425 366/85 |
| 7,476,416 | B2 | * | 1/2009 | Tynan, Jr. ............. B01F 7/145 427/207.1 |
| 7,513,677 | B2 | * | 4/2009 | Gneuss ............... B29B 7/485 366/83 |
| 2002/0065330 | A1 | | 5/2002 | Klotzer |
| 2005/0047267 | A1 | * | 3/2005 | Gneuss ............... B29B 7/485 366/83 |
| 2009/0118385 | A1 | | 5/2009 | Hasegawa |
| 2010/0238759 | A1 | | 9/2010 | Pohl |
| 2013/0281625 | A1 | | 10/2013 | Keung et al. |
| 2014/0286121 | A1 | | 9/2014 | Bosiers et al. |

FOREIGN PATENT DOCUMENTS

| | | |
|---|---|---|
| DE | 4431913 | 2/1996 |
| DE | 19534644 | 3/1997 |
| DE | 19539203 | 4/1997 |
| DE | 10356423 | 6/2005 |
| DE | 102009038280 | 2/2011 |
| EP | 0694376 | 1/1996 |
| EP | 0818292 | 1/1998 |
| EP | 1230296 | 7/2005 |
| EP | 1434680 | 7/2006 |
| GB | 2179886 | 3/1987 |
| GB | 2204524 | 11/1988 |
| WO | 0134687 A1 | 5/2001 |
| WO | 03033240 | 4/2003 |
| WO | 2005049750 | 6/2005 |
| WO | 2008075941 | 6/2008 |

OTHER PUBLICATIONS

Final Office Action issued in U.S. Appl. No. 14/890,999, dated May 24, 2018, 22 pages.
Entire patent prosecution history of U.S. Appl. No. 14/890,999, filed Nov. 13, 2015, entitled, "Method for Producing a Foam Body by Means of an Extrusion Process, and Extrusion Device for Producing a Foam Body."
International Search Report issued in PCT/EP2014/058634 dated Jul. 31, 2014.
Written Opinion of the International Searching Authority dated Jul. 31, 2014 for International Application No. PCT/EP2014/058634.
Written Opinion of the International Searching Authority dated Sep. 12, 2014 for International Application No. PCT/EP2014/05863.
USPTO Non-Final Office Action issued in U.S. Appl. No. 14/890,999, dated Oct. 18, 2018, 17 pages.
International Search Report for International Application No. PCT/EP2014/058633 dated Sep. 12, 2014.

* cited by examiner

METHOD FOR PRODUCING A FOAMED BODY BY EXTRUSION AND EXTRUSION DEVICE FOR PRODUCING A FOAMED BODY

CROSS REFERENCE TO RELATED APPLICATIONS

This application is the U.S. National Phase Application of PCT International Application No. PCT/EP2014/058633, filed Apr. 28, 2014, which claims priority to German Patent Application No. 10 2013 008 201.3, filed May 14, 2013, the contents of such applications being incorporated by reference herein.

FIELD OF THE INVENTION

The invention relates to the field of foam extrusion and in particular to the production of plastics foam by means of tandem extrusion installations.

BACKGROUND OF THE INVENTION

It is known to produce foam bodies by means of a first extruder, which generates a plastics melt from plastics granulate, and by means of a downstream second extruder, which receives said plastics melt, thermally changes it and presses it through an outlet nozzle. The plastics melt has foaming agent added to it, which foaming agent makes a significant contribution to the expansion of the plastics melt as it emerges from the outlet nozzle.

For numerous applications, it is advantageous for the foam body to be formed with the most homogeneous mechanical characteristics possible, wherein said characteristics are significantly linked to the arrangement and geometry of the cells that form as a result of the expansion of the foaming agent. Thus, the foam body is normally subjected to aftertreatment in order to homogenize the cell structures, wherein, for this purpose, methods are known for example from the field of thermoforming, or the foam body is heated and/or stored in a known manner for post-expansion.

SUMMARY OF THE INVENTION

Since aftertreatment processes that have hitherto been known do not entirely satisfy the demand for a homogeneous foam structure, an aspect of the invention specifies an approach with which said aim can be at least partially achieved.

The approach described here makes it possible for the plastics melt, which is conducted through an outlet nozzle, to have a low temperature difference over the cross section of the plastics melt, whereby the expansion process at the outlet nozzle likewise takes place in homogeneous fashion over the cross section of the outlet nozzle. The expansion is linked to the temperature, such that a homogeneous temperature of the plastics melt at the outlet nozzle leads to homogeneous cell formation, whereby, already at the outlet nozzle, the size of the cells generated as a result of the expansion exhibits considerably less scatter than in the case of less homogeneous temperature distributions such as arise in conventional methods. Thus, the foamed plastics body obtained already at the outlet nozzle has a homogeneous structure, and further aftertreatment processes that may be performed on the plastics body (for further homogenization of the structure, such as heating, thermoforming and storage) thus build on a more homogeneous structure than in conventional methods. It is thus possible, in relation to known methods, to produce plastics bodies with less thickness variance and a more homogeneous characteristics profile, wherein furthermore, with the approach described here, cell size differences of marginal layers of the plastics body in relation to the interior of the plastics body are reduced in relation to known methods. The approach described here thus addresses the expansion process already at the outlet nozzle, such that, already with a more homogeneous foamed plastics body, any aftertreatment can be performed in such a way that the aftertreatment leads to more homogeneous structures than are obtained with known methods. The thermal homogenization of the temperature distribution over the cross section of the plastics melt which is fed (substantially with said homogenized temperature distribution) to the outlet nozzle for the expansion of the plastics melt can be realized in a variety of ways, as discussed below.

Therefore, according to one aspect of the invention, a method for producing a foamed body by extrusion is described. A plastics melt is generated within a casing of a first extruder. For this purpose, plastic—for example in granulate form—is fed to the first extruder. At the point at which it is fed into the first extruder, the plastic may already include one or more additives and/or foaming agent, wherein one or more additives and/or the foaming agent may also be added to the plastic, or to the plastics melt that is formed therefrom, after the plastic has been fed into the first extruder, for example by virtue of the at least one additive and/or foaming agent being fed into the first extruder or into components used in the method which follow the first extruder. The foaming agent is preferably fed to the plastics melt within the step of the generation of the plastics melt (in the first extruder), wherein, depending on the application, the foaming agent may be fed to the plastics melt in a melt line which connects the first extruder to a downstream second extruder.

The plastic may also be fed as a plastics starting material or plastics starting material mixture, wherein the plastics starting material or the plastics starting material mixture is converted into the plastic or into the plastics melt by polymerization or polycondensation, in particular in the first extruder. The generation of the plastics melt may thus encompass a melting and/or a conversion of a plastics starting material or of a plastics starting material mixture, in particular within the first extruder and/or in a feed line which leads to the first extruder.

Furthermore, the generation of the plastics melt may encompass a feed of at least one foaming agent and/or of at least one additive to the plastics melt. It is for example possible for antistatic agents, stabilizers, colorants, filler materials, flame retardants and/or nucleating agents to be added as additives. Suitable foaming agents are solid and liquid substances which, as the plastics melt that includes the at least one foaming agent is conducted, expand (by chemical reactions and/or by physical expansion), for example as a result of at least partial conversion into a gaseous phase. It is also possible, under ambient conditions, for gaseous substances in liquid or gaseous form to be added as foaming agent, which expand further owing to the expansion of the plastics melt at the outlet nozzle and thereby form the cells of the foamed plastics body. Suitable foaming agents are for example ethers, hydrocarbons, ketones, esters, air-conditioning gases of the third and fourth generations (hydrofluorocarbons, HCOs and hydrofluoroolefins, HFOs), carbon dioxide or other gases such as nitrogen. The foaming agent may in particular be fed as foaming agent solution.

Suitable plastics for the generation of the plastics melt include in particular thermoplastics, for example polyethene, polypropene, polystyrene, polyvinyl chloride, polyacrylonitrile, polyamides, polyester, polyacrylates, one or more bioplastics (polylactic acids, cellulose products, starches, thermoplastics starches), mixtures of multiple different thermoplastics, or mixtures of chemically corresponding thermoplastics but of different types. In particular, use may be made of recycled plastics. The plastic is fed as granulate or powder to the first extruder in order to generate the plastics melt in the first extruder, or is fed as starting material or starting material mixture from which the plastics melt is generated by chemical reaction. In the first extruder, the plastics melt is, in particular, prepared, whereby the first extruder can also be referred to as preparation extruder.

The plastics melt is conveyed to an outlet nozzle. Said outlet nozzle is in particular an outlet nozzle of a second extruder. Said second extruder is positioned downstream of the first extruder, either directly via a melt line, or via a further extruder, which can be referred to as connecting extruder. The plastics melt that is conveyed to the outlet nozzle has the at least one foaming agent (and, if appropriate, at least one further additive). The plastics melt may, as described above, include the at least one foaming agent. The plastics melt expands after being conducted through the outlet nozzle, in particular owing to the expansion that occurs as it passes through the outlet nozzle. (The expansion corresponds to, or results from, the pressure difference between the extruder interior and the ambient pressure.) The expansion of the plastics melt occurs after said plastics melt has been conducted through the outlet nozzle, and possibly also as the plastics melt is being conducted through the outlet nozzle. The plastics melt is in particular caused to expand by expansion of the at least one foaming agent, wherein the foaming agent increases in volume owing to the decrease in pressure in the plastics melt as it passes through the outlet nozzle, wherein this is in particular associated with a phase change of the foaming agent to a gaseous phase. The plastics melt is in particular conducted through at least one gap of the outlet nozzle in order to generate a foamed plastics layer as a foamed plastics body. The gap may run along a closed line, for example along a circle, an oval or a polygon. The gap through which the plastics melt is conducted may furthermore have a rectangular cross section, in particular a flat rectangular cross section, for example with a side ratio of at least 1:5, 1:10, 1:15, 1:20, 1:50 or greater. The foamed plastics body may thus emerge in the form of a circumferentially closed shell, or in the form of a flat layer or in the form of a foil (with a side ratio as described above), from the outlet nozzle.

To obtain a homogeneously distributed cell size in the plastics body, it is provided that, before the plastics melt is conducted through the outlet nozzle, the temperature distribution over the cross section of the plastics melt is homogenized. Said plastics melt that has been thermally homogenized in this way is conducted through the outlet nozzle. The reduction in temperature differences is therefore also referred to as thermal homogenization.

The temperature differences between different positions in the cross section, in particular between different radial positions in the cross section of the plastics melt, are reduced, preferably to a maximum temperature difference of no greater than 8° C. or 5° C., preferably no greater than 2° C., and in particular of no greater than 1° C. The maximum temperature difference corresponds to the highest temperature of the plastics melt minus the lowest temperature of the plastics melt within the same cross section of the plastics melt. The difference between the coldest point and the warmest point in the cross section of the plastics melt is thus no greater than the stated temperature difference. Said temperature difference preferably relates to the cross section of the plastics melt directly upstream of the outlet nozzle, and may furthermore relate to the cross section of the plastics melt immediately upstream of said section, in particular to the cross section of the plastics melt at or directly downstream of the point (in relation to the conveying direction of the plastics melt) at which the temperature differences of the plastics melt are reduced. It is preferably the case that, between the point at which the temperature differences in the cross section of the plastics melt are reduced and the outlet nozzle, the scatter of the temperature distribution over the cross section is not increased. Before the plastics melt is conducted through the outlet nozzle, the scatter of the temperature over the cross section is thus reduced. Radial positions refer to positions which are defined by the spacing of a central normal of the cross section. Plastics melt fractions at different radial positions have different spacings of the central normal of the cross section.

In the first and/or in the second extruder, the plastics melt is conveyed by means of an extruder screw apparatus. Said extruder screw apparatus has multiple screw spindles. The screw spindles are distributed circumferentially around the extruder screw apparatus. The screw spindles rotate in recessed fashion in the circumferential surface of the extruder screw apparatus. The extruder screw apparatus likewise rotates. As a result of these movements, in particular as a result of the large surface area covered by the screw spindles, fractions of the plastics melt situated at different locations or radii in the cross section of the plastics melt are mixed. In this way, temperature differences in the cross section of the plastics melt are reduced. At the same time, it is preferably the case that, by means of the screw spindles, pressure is built up in the plastics melt, or at least, pressure losses are at least partially compensated by way of the mixing processes. In this way, before the plastics melt is conducted through the outlet nozzle, temperature differences between different radial positions in the cross section of the plastics melt are reduced, and the plastics melt that has been thermally homogenized in this way is conducted through the outlet nozzle at a predefined pressure.

The extruder screw apparatus used in the method may, in one embodiment of the extrusion apparatus described here, have different length sections. The second extruder, and in particular the extruder screw apparatus thereof, has first and second length sections which have different mixing characteristics or conveying characteristics. The first and second longitudinal sections impart a conveying action, or are designed for this purpose, for example by virtue of the fact that they have screw threads (which are preferably continuous or else are only partially interrupted). The first length sections are in particular designed for mixing and, for example, have mixing structures, and are preferably designed for mixing by virtue of the fact that they have interrupted screw threads and/or some other mixing structures, for example paddles or screw threads with holes. The second length sections are in particular designed for building up pressure in order to partially or entirely compensate for pressure losses arising, for example, owing to the first sections or owing to other mixing structures. For this purpose, the second length sections may have continuous or preferably interrupted screw threads. The section upstream of the outlet nozzle is preferably a first length section.

First and second length sections (of the same extruder or of the same extruder screw apparatus) alternate. It is preferable for multiple (that is to say two or more) first length sections to be provided in one extruder (in particular in the second extruder). Furthermore, it is preferable for multiple (that is to say two or more) second length sections to be provided in one extruder (that is to say in the same extruder) (in particular in the second extruder). In particular, between first and second length sections (of the same extruder screw apparatus or of the same extruder), no transitions are provided which do not have a screw thread. The length sections preferably directly follow one another, wherein this applies in particular to the same extruder or to the same extruder screw apparatus. The first and second length sections, through which plastics melt is conducted alternately, directly adjoin one another. Since the length sections also reflect the sequence of the steps of processing of the plastics melt, mixing steps and pressure build-up steps in the second extruder follow one another, preferably in alternating fashion, and in particular directly. It is also possible for at least one of the length sections, preferably first and second length sections, to be provided in the first extruder or in a connecting extruder between the first and the second extruder. The plastics melt is conveyed in the first extruder, or in the connecting extruder, too. In particular, mixing or a build-up of pressure, or both, is or are also performed there, preferably multiple times and in particular in alternation. A connection may be provided between length sections of different extruders, such that no direct sequence of length sections is realized. Also, the first extruder may have first and/or second length sections, preferably in the manner described here for the second extruder.

In particular, the first and second length sections of the extruder screw apparatus, in particular of the same extruder screw apparatus, directly adjoin one another. The screw thread of the extruder screw apparatus extends along the first, the second and preferably both length sections of the extruder screw apparatus. The screw thread may be continuous, may have continuous screw thread sections adjoining one another, or may have at least one screw thread or at least one screw thread section adjoined by a mixing structure, said mixing structure alternatively bridging the screw thread sections. The mixing structure may have screw threads which are interrupted in the direction of rotation (and which directly adjoin one another) and/or other mixing structures, for example paddles or screw threads with holes.

The extruder screw apparatus thus has edges which point toward the casing of the respective extruder and which extend as far as the casing. If the extruder screw apparatus has a mixing structure, the latter has edges and extends to the casing of the extruder. The edges of the mixing structure are offset with respect to one another in the direction of rotation or run continuously in the direction of rotation. In particular, the edges of the mixing structure are not offset with respect to one another in the longitudinal direction of the extruder. In the case of an extruder screw apparatus which has a continuous screw thread, said thread forms an edge which points toward the casing of the extruder and which extends as far as the casing. The extruder screw apparatus thus has one or more edges which extend as far as the casing and which, in the longitudinal section of the extruder, run in continuous fashion or so as to directly adjoin one another.

The extruder screw apparatus has an envelope (arising from rotation of the extruder screw apparatus) which extends to the casing of the extruder substantially over the entire length of the extruder screw apparatus. The screw thread, the screw thread sections and/or the mixing structure (that is to say all of the screw threads, screw thread sections and/or mixing structure) have a common envelope which extends as far as the casing of the extruder substantially over the entire length of the extruder screw apparatus. Here, in particular, it may be the case that the end sections of the extruder screw apparatus do not have this characteristic. An envelope that extends as far as the casing of the extruder gives rise to only small empty volumes, short residence times, and in particular no region at which deposits can accumulate. The extruder in question thus has no region at which no edge of the extruder screw apparatus extends as far as the casing.

It is also provided that fractions of the plastics melt which are present at different radial positions are mixed before the plastics melt is fed to the second extruder. It may be provided that the fractions, before being fed to the second extruder, are mixed in the first extruder (and/or in a connecting extruder or a melt line which connects the first extruder to the second extruder), preferably by means of a homogenization apparatus. Said homogenization apparatus may be formed by an extruder screw apparatus of the first extruder, in particular by a first length section thereof. The homogenization apparatus may furthermore be provided by a length section of a connecting extruder between the first and the second extruder, in particular by a length section of the connecting extruder designed in the manner of the first length section. The homogenization apparatus may furthermore be provided by mixing elements within a melt line between the first and the second extruder.

It may be provided that the fractions (of the plastics melt at different radial positions), before being fed to the second extruder, are mixed in a melt line, in particular in the melt line mentioned above. The plastics melt is conducted through said melt line from the first extruder to the second extruder. In the melt line, there are provided mixing elements which mix the fractions in the melt line. The melt line may furthermore have a temperature control apparatus which absorbs heat from or supplies heat to plastics melt situated in the melt line. The mixing elements may be designed such that the temperature thereof can be controlled, and may in particular have a heat medium duct or heating elements, preferably electric heating elements. In this way, the temperature of the mixing elements can be influenced by means of a heat medium or by means of electrical current, such that said mixing elements can in turn influence the melt temperature. The heat medium duct or the heating elements extend in the interior of the mixing element and are preferably separated from the interior space into which the mixing elements project.

Furthermore, it may be provided that the fractions of the plastics melt present at different radial positions, before being fed to the second extruder, are mixed in a connecting extruder, in particular in the connecting extruder mentioned above. The latter conveys the plastics melt from the first extruder to the second extruder. Furthermore, the connecting extruder may be designed to convey the plastics melt by means of multiple screw spindles. These are distributed, parallel to one another and in particular coaxially with respect to the longitudinal axis of the connecting extruder, around said longitudinal axis.

It may furthermore be provided that, in the first and/or in the second extruder, the plastics melt is conveyed by means of multiple screw spindles. These are distributed coaxially with respect to the longitudinal axis of the first and/or second extruder.

A further aspect is the reduction of the temperature difference between fractions of the plastics melt situated at different cross-sectional positions of the plastics melt by mixing said fractions before the plastics melt is fed to the outlet nozzle. In particular, the plastics melt is mixed immediately upon being released into the outlet nozzle or (immediately) before being fed to the outlet nozzle.

It is therefore provided that fractions of the plastics melt which are present at different radial positions are mixed before the plastics melt passes through the outlet nozzle of the second extruder. Here, it may be provided that the fractions, before being fed to the outlet nozzle, are mixed in the second extruder by means of a homogenization apparatus of an extruder screw apparatus of the second extruder. Here, mixing is performed by that extruder screw apparatus at which the plastics melt is fed from the first extruder, or from a melt line or from a connecting extruder, to the second extruder. The second extruder may be of multi-element form, and may comprise a first section with the abovementioned extruder screw apparatus, and an end section with the outlet nozzle, with an (optional) connection immediately preceding the outlet nozzle, and with a mixer immediately preceding the outlet nozzle and, if appropriate, the connection. The connection may comprise a (further) melt line or a (further) connecting extruder, or may be composed substantially of said melt line or the connecting extruder (aside from sensors, temperature control means, etc.). The further connecting extruder and the first section of the second extruder may have separate or different extruder screw apparatuses or may have sections of one extruder screw apparatus which differ. The first section directly adjoins said end section. Since the second extruder may be of multi-element form, it may also be referred to as second extruder arrangement. This applies to the method described here and to the extrusion apparatus described here.

It may be provided that the fractions, before being fed to the outlet nozzle, are mixed in a connection through which the plastics melt is fed to the outlet nozzle, in particular in a connection designed in the manner of the connection mentioned above. In the connection, there may be provided mixing elements which mix the fractions connection. Said mixing elements may be connected in static fashion to the rest of the connection, or may be driven, in particular as an extruder screw apparatus in said connection. The connection may therefore be provided in particular as an (additional) melt line or as a connecting extruder or as a mixer. The connection may have a temperature control apparatus which absorbs heat from or supplies heat to plastics melt situated in the connection, wherein the connection is in particular designed as a melt line.

It may furthermore be provided that the fractions, before being fed to the outlet nozzle, are mixed in the connection. Said connection may be designed as a connecting extruder as part of an end section of the second extruder. The connection conducts the plastics melt to the outlet nozzle from that section of the second extruder which is situated upstream of the end section (that is to say from the first section of the second extruder). The connection (like the outlet nozzle) belongs to the end section of the second extruder. Within the connection, an extruder screw apparatus, in particular with multiple screw spindles as described herein, conveys the plastics melt. Said extruder screw apparatus may be one which is provided in addition to an extruder screw apparatus of the first section of the second extruder. The second extruder comprises the first section which is directly adjoined by the end section. The end section of the second extruder may therefore also be regarded as the second section of the second extruder, wherein the plastics melt is fed, in succession, firstly to the first section and then to the second section.

One embodiment provides that the plastics melt is conveyed from the first extruder to the second extruder by way of a connecting extruder (in particular a connecting extruder as described above or further below. An extruder screw apparatus of the connecting extruder has multiple screw spindles which are distributed circumferentially around the extruder screw apparatus and by means of which those fractions of the plastics melt which are present at different radial positions of the cross section of the plastics melt are mixed before the plastics melt enters the second extruder.

As will be presented in more detail, the temperature difference can be reduced by mixing plastics melt fractions at different cross-sectional or radial positions and/or through (additional) temperature control of the plastics melt, in particular through different temperature control of different plastics melt fractions situated at different cross-sectional or radial positions. These two variants for the reduction of the temperature differences will be considered in more detail below.

In one embodiment of the method, the temperature differences between different radial positions in the cross section of the plastics melt are reduced by mixing fractions of the plastics melt, in particular fractions situated at different positions of the cross section of the plastics melt, and preferably by mixing fractions which are present at different radial positions of the cross section. It is preferably provided that first mixing is performed already before the plastics melt is fed to the second extruder. In this way, in the first extruder or in a component which feeds the plastics melt to the second extruder (for example a melt line or a connecting extruder), the plastics melt can be mixed over its cross section. In the second extruder, the melt thermally homogenized in this way can be conveyed and in particular pressurized, in order for the plastics melt to undergo a defined pressure drop as it is conducted through the outlet nozzle. In this way, the mixing that is performed before the plastics melt is fed to the second extruder does not affect the pressure profile in the second extruder. In particular, the mixing may be performed in accordance with desired operating parameters, without thereby falling below the required pressure before the foaming process. Thus, the mixing can be associated with a certain pressure drop without this adversely affecting the pressure at which the plastics melt is conducted through the outlet nozzle, because in the second extruder, the pressure is built up in an already thermally homogenized plastics melt. The mixing is preferably by first length sections or else (additionally) by static mixers.

In one approach, a thermally homogenized plastics melt is realized by way of mechanical mixing. One embodiment of the method described here therefore provides for first mixing to be performed by the first extruder. The latter may be designed as a mixing extruder, in particular as a continuous mixer. Thus, the plastics melt is conveyed (and in particular also mixed) in the first extruder, which is additionally designed as a mixing extruder. Aside from this, it may be provided that, in the first extruder, the plastics melt is heated in order to generate the plastics melt, in particular by virtue of the casing of the first extruder being heated. At this point, it should be noted that, in the second extruder (aside from further functions) the plastics melt may be cooled by an extruder screw apparatus of the second extruder, or else by cooling of the casing of the second extruder. With regard to the reduction of the temperature difference by temperature control, reference is made to the sections further below.

As a further possibility, the plastics melt may be conveyed from the first extruder to the second extruder via a melt line. In this case, the melt line connects the first extruder to the second extruder directly or via a connecting extruder. As it flows to the melt line, as it is conveyed through the melt line, and/or as it emerges from the melt line, the plastics melt flow formed by the conveyed plastics melt is varied, wherein in particular, the cross section and/or the direction of the plastics melt flow are/is varied. The change in direction and/or of the cross section along the plastics melt flow (that is to say along the conveying path of the plastics melt) leads to the desired mixing of fractions of the plastics melt which are present at different positions/radii of the cross section.

It may furthermore be provided that, furthermore, fractions of the plastics melt which are present at different radial positions or positions of the cross section of the plastics melt are mixed before the plastics melt is fed to the second extruder.

Here, it may be provided that the fractions, before being fed to the second extruder, are mixed in the first extruder by virtue of the plastics melt being conveyed through a homogenizing apparatus of an extruder screw apparatus of the first extruder. Said homogenizing apparatus may be provided by the screw spindles, which can be moved by means of the extruder screw apparatus and which themselves rotate about their axis, and/or by sections on the circumferential surface of the extruder screw apparatus which are provided between the screw spindles and which may in particular have structures which project into the plastics melt, for example circular arc-shaped or helical grooves or other structural forms which are suitable for mixing, conveying or building up pressure.

Furthermore, it may be provided that the fractions, before being fed to the second extruder, are mixed in a melt line. The plastics melt is conducted from the first extruder to the second extruder through said melt line. In the melt line there are provided mixing elements which mix the fractions in the melt line. Alternatively or in addition, the melt line may have a temperature control apparatus which absorbs heat from or supplies heat to plastics melt situated in the melt line. Such a temperature control apparatus may furthermore be provided on the first and/or second extruder or on the connecting extruder. In this way, it is also possible for heat to be dissipated from the interior of the first and/or of the second extruder and/or of the connecting extruder or supplied to the interior. The heat may be transported via the casing and/or via the extruder screw apparatus of the respective extruder or connecting extruder, or else may be transported via mixing elements and/or via the wall of the melt line.

By means of the invention, demixing processes that occur without the mixing processes described here, that is to say in the case of conveyance through merely a pipe, are avoided. In particular, thermal inhomogeneities are avoided, wherein, without homogenization processes according to the invention and in the case of conveyance through a pipe, the flow speed of the plastics melt is approximately 10 times faster in the center of the pipe than that at the wall, giving rise to the inhomogeneous temperature distribution. If it were attempted to reduce the pipe diameter in order to reduce the flow difference, friction effects would arise, leading to local heating of the plastics melt and thus to the opposite effect (that is to say more intense inhomogenization of the temperature distribution over the cross section). By virtue of the fact that, in one embodiment, static mixing elements and/or cooling elements are incorporated into the line, pressure is required here already for the purposes of conveyance through said elements. It has hitherto been prior art that, for this reason, only very large-diameter and/or short elements have been used, such that it has duly been possible to obtain an improvement in homogeneity in this way, but not an optimization thereof. The use of melt pumps in order to provide more pressure duly has advantages with regard to the possibility of then likewise using more mixing elements, but has the disadvantage that, in melt pumps, thermal temperature peaks are generated which again counteract the homogenization, and which can even lead to thermal damage of the plastics material. The invention prevents such damage, and nevertheless permits a homogeneous temperature distribution over the cross section of the plastics melt, in particular immediately upstream of the outlet nozzle.

Furthermore, the plastics melt may be conveyed from the first extruder to the second extruder via a connecting extruder. As it is conveyed through the connecting extruder, the plastics melt undergoes intense mixing, wherein in particular, fractions of the plastics melt at different positions of the cross section of the plastics melt are mixed with one another. The connecting extruder is preferably equipped with multiple screw spindles. These are oriented coaxially with respect to the longitudinal axis of the connecting extruder and are distributed circumferentially. The screw spindles convey and mix the plastics melt by way of rotation of the screw spindles about their respective longitudinal axes, and preferably also by way of rotation of the longitudinal axes of the screw spindles about a common axis. The common axis corresponds to the longitudinal axis of the connecting extruder. Said longitudinal axis of the connecting extruder lies in the center of the screw spindle. The screw spindles rotate within an extruder screw apparatus in which they are rotatably mounted. The axes of the screw spindles rotate jointly about the axis of the extruder screw apparatus. The extruder screw apparatus itself rotates about an axis which corresponds to the longitudinal axis of the connecting extruder or to the common axis. As a result of the rotation of the extruder screw apparatus, the screw spindles rotate about the longitudinal axis of the connecting extruder, as said screw spindles are mounted (at least partially) in the extruder screw apparatus. The screw spindles rotate at least partially in recessed fashion within the extruder screw apparatus. A section of the screw spindles protrudes from the circumferential surface of the extruder screw apparatus and thereby conveys the plastics melt. The screw spindles rotate within respective envelope curves which preferably do not overlap. The screw spindles are circumferentially spaced apart from one another. The extruder screw apparatus has sections on the circumferential surface which lies between the screw spindles. Said sections have helical structures. The circumferential sections of the extruder screw apparatus which lie between the screw spindles contribute to the conveyance, to the build-up of pressure and/or to the mixing of the plastics melt.

The screw spindles may be driven by way of a common drive. Said drive, or a further drive, may furthermore be used to drive the extruder screw apparatus, along the circumference of which the screw spindles are distributed. The extruder screw apparatus may also be driven individually relative to the screw spindles. The extruder screw apparatus may have at least one length section in which no screw spindles are provided. Along the circumference of said length section there may be provided structures, in particular screw structures, which are driven in rotation together with the extruder screw apparatus and which are in direct contact with the plastics melt. Said length section may in particular be a length section of the guide body mentioned below. The length section may be arranged on one end (as viewed along the longitudinal axis of the extruder screw apparatus) of the extruder screw apparatus or of the guide body. The at least one length section which has no screw spindles may be a first length section or a second length section. Likewise, the screw spindles are may constitute a length section which corresponds to a first or to a second length section. The screw spindles and the length sections of the extruder screw apparatus are preferably different length sections in terms of the characteristics of the first and second length sections. A length section of the extruder screw apparatus without screw spindles is preferably formed by a guide body as described here.

The extruder screw apparatus described here may comprise a guide body which has recesses, with the screw spindles at least partially positioned in the recesses of the guide body, as described in the international application PCT/EP02/11391, published as WO03/033240 A1, which is incorporated by reference, or in the patent EP 1 434 680 B1, which is incorporated by reference, granted therefrom. In particular, as a connecting extruder, use may be made of an extruder as described in WO03/033240, which is incorporated by reference. Here, the connecting extruder may be designed in accordance with the statements in WO03/033240 with regard to the configuration and arrangement of the envelope curves, with regard to the form and arrangement of the screw spindles, with regard to the absence of toothing between the screw spindles, with regard to the pitches of the screws (of the screw spindles), with regard to the drive of the extruder screw and/or of the screw spindles, with regard to the mechanical and/or drive connection between the extruder screw and the screw spindles, with regard to the arrangement and construction of the guide body and/or of the shaft section, with regard to the journals and/or toothed rings, or in accordance with individual features of the figure description and/or the figures of WO03/033240.

Furthermore, it should be noted that the first extruder and/or the second extruder may also be designed in the manner of the connecting extruder described. Furthermore, the connecting extruder may also be designed as a mixing extruder, as a single-screw extruder or as a twin-screw extruder, or else as a multi-screw extruder with more than two extruder screws. In the case of twin-screw extruders or else in the case of multi-screw extruders, extruder screws arranged adjacent to one another (overlapping or not overlapping) are used, which extruder screws are not integrated into one another or into a common extruder screw apparatus, such as is the case, by contrast, in the extruder screw apparatus described here, which has multiple screw spindles.

As already mentioned, the temperature difference within the plastics melt may furthermore be (additionally) reduced through temperature control of the plastics melt. This approach may be used instead of or in combination with the mixing processes described here. In one embodiment, the reduction of the temperature differences between different radial positions in the cross section of the plastics melt encompasses a step of controlling the temperature of the plastics melt.

The plastics melt may be subjected to temperature control by virtue of the plastics melt being cooled within the second extruder. Fractions of the plastics melt situated at different positions in the cross section of the plastics melt (for example at the outer edge and further to the inside) are subjected to different temperature control, wherein it may also be provided that only sections of the plastics melt at particular positions in the cross section are subjected to temperature control (for example only sections at the outer edge or only sections at the inside of the cross section, that is to say at the extruder screw apparatus). "Temperature control" refers to the supply or discharge of heat.

In the context of the temperature control, heat may be exchanged between the plastics melt and the casing of the first extruder. Alternatively or in combination with this, heat may be exchanged between the plastics melt and a casing of the second extruder. Furthermore, heat may be exchanged between the plastics melt and a casing of the connecting extruder. Within the casing of the respective extruder, the plastics melt is conveyed, in particular by means of the extruder screw apparatus described here. Here, in particular, heat is exchanged between fractions of the plastics melt and the respective casing, which fractions are situated close to the casing or directly adjacent to said casing. Finally, in the context of the temperature control, heat may be exchanged between the melt line, or temperature-controlled mixing or static cooling elements situated in the melt line, and the plastics melt. Alternatively or in combination with an exchange of heat between the plastics melt and the casing, in the context of the temperature control, heat may be exchanged between the plastics melt and an extruder screw apparatus. Therefore, in the context of the temperature control, it may be provided that heat is exchanged between the plastics melt and an extruder screw apparatus, in particular between the extruder screw apparatus and fractions of the plastics melt which are situated close or directly adjacent to the extruder screw apparatus. Here, heat is exchanged with respect to an extruder screw apparatus which generates and/or conveys the plastics melt in the first extruder, which conveys the plastics melt in the second extruder, and/or which conveys the plastics melt in the connecting extruder, in particular from the first to the second extruder.

Furthermore, heat may be transported between the casing and/or the extruder screw apparatus, on the one hand, and a heat source or a heat sink, on the other hand, for example via a heat medium circuit, or heat may be generated in or on the casing or the extruder screw apparatus, or may be transmitted thereto, in particular by means of an (electric) heating device. Furthermore, a cooling device may be provided which serves as a heat sink and by means of which the plastics melt is cooled proceeding from the casing or proceeding from the extruder screw apparatus.

As already mentioned, the temperature control, in particular by exchange of heat, and the mixing may be combined in order to reduce temperature differences between different positions in the cross section of the plastics melt. To assist the exchange of heat, a heat medium may be conducted through ducts in the casing or in the extruder screw apparatus.

According to a further aspect of the approach described here, an extrusion apparatus is presented which is designed for producing a foamed body. Said extrusion apparatus comprises multiple components and can therefore be regarded as an extrusion installation. The extrusion apparatus comprises a first extruder, in particular the first extruder already described here, and a second extruder, in particular the second extruder already described here. The second extruder is positioned downstream of the first extruder.

The first extruder is equipped with an introduction region. Said introduction region has an introduction duct (for example in the sense of the feed described here) designed for the feed of plastics particles. The introduction duct is in particular designed for the feed of the plastic described here in the form of granulate or powder. The first extruder may furthermore have a feed designed for introducing additives or a foaming agent.

The second extruder is equipped with an outlet region. Said outlet region has an outlet nozzle, for example the outlet nozzle described here. The outlet nozzle is arranged on that end of the second extruder which is situated opposite the first extruder.

The extrusion apparatus has at least one extruder screw apparatus which is designed for conveying a plastics melt that is generated from the fed plastics particles in the introduction region.

The second extruder is equipped with at least one extruder screw apparatus which has first length sections designed for conveying and mixing the plastics melt. The extruder screw apparatus furthermore has second length sections which are designed for conveying, and building up pressure in, the plastics melt. The first and second length sections alternate (in the longitudinal direction of the second extruder).

The extruder screw apparatus of the second extruder, an extruder screw apparatus of the first extruder, or an extruder screw apparatus of an end section, which has the outlet nozzle, of the second extruder, may comprise multiple screw spindles. These are distributed, coaxially with respect to the longitudinal axis of the extruder screw apparatus, around said longitudinal axis.

It may furthermore be provided that the first extruder is connected to the second extruder via a melt line. In the melt line there are provided mixing elements which are designed for mixing fractions of the plastics melt which are present at different radial positions in the cross section of the plastics melt. Said mixing elements are in particular static vanes, guide plates or the like. It may also be provided that the melt line has a temperature control apparatus which absorbs heat from or supplies heat to plastics melt situated in the melt line.

According to one aspect of the extrusion apparatus, the first and/or the second extruder comprise(s) an extruder screw apparatus which has multiple screw spindles which are distributed circumferentially around the extruder screw apparatus. In this way, the extruder screw apparatus is designed to reduce temperature differences between different radial positions in the cross section of the plastics melt, and to conduct a plastics melt that has been thermally homogenized in this way through the outlet nozzle. For this reason, the extruder screw apparatus (in particular the screw spindles thereof) can be regarded as a melt temperature homogenization device.

One embodiment of the extrusion apparatus provides that the extruder screw apparatus of the second extruder, an extruder screw apparatus of the first extruder, an extruder screw apparatus of an optional connecting extruder between the first and the second extruder, and/or an extruder screw apparatus of an end section, which has the outlet nozzle, of the second extruder comprise(s) multiple screw spindles. Said screw spindles are distributed circumferentially about the extruder screw apparatus. The screw spindles of the extruder screw apparatus and/or of the extruder screw apparatuses have envelope curves which are spaced apart by sections on the circumferential surface of the extruder screw apparatus. The sections are preferably designed for conveying and/or mixing plastics melt and/or for building up pressure in the plastics melt. A preferred embodiment provides that the screw spindles are at least partially recessed in the respective extruder screw apparatus and mounted rotatably therein. Individual drives may be provided for the extruder screw apparatus, on the one hand, and the screw spindles thereof, on the other hand.

Furthermore, the first extruder may be connected to the second extruder via a melt line. Mixing elements may be provided in the melt line. Said mixing elements are designed for mixing fractions of the plastics melt which are present at different radial positions in the cross section of the plastics melt. Alternatively or in addition, the melt line may have a temperature control apparatus which absorbs heat from or supplies heat to plastics melt situated in the melt line.

The extruder screw apparatus may have different first and second length sections as described here. The first or the second length section may be provided by a length section of the extruder screw apparatus over which the screw spindles extend, whereas at least one length section of the extruder screw apparatus adjoining this forms a further of the first or second length sections. The length section over which the screw spindles extend may be a first length section, whereas the adjoining length section may be a second length section. Furthermore, the length section over which the screw spindles extend may be a second length section, whereas the adjoining length section may be a first length section. The screw spindles may exhibit the characteristics of a first or second length section, and the sections (in the circumferential direction) between the screw spindles may exhibit the characteristics of a second or first length section. In this way, the first and second length sections may overlap in terms of their function. It is preferable for the sections to reproduce the function of a first length section. The screw spindles may in particular reproduce the function of a second length section. This may however also be reversed.

The extrusion apparatus preferably has at least one melt temperature homogenization device. In particular, the mixing elements and/or the first length sections or also the temperature control apparatus may be regarded as a melt temperature homogenization device. The melt temperature homogenization device has the effect, in particular, that the temperature distribution of the plastics melt in the radial direction is homogenized (and thus acts in a direction substantially perpendicular to the longitudinal axis of the extruder screw apparatus). The melt temperature homogenization device utilizes several or all types of mixing—distributive, dispersive and rearranging mixing—in particular individually and preferably in combination. The at least one melt temperature homogenization device is therefore designed to equalize temperature differences between fractions of the plastics melt which are situated closer to the longitudinal axis of the extruder screw apparatus (or of the respective extruder) and fractions of the plastics melt which are situated further remote from the longitudinal axis. The melt temperature homogenization device is in particular capable of performing the step, described here, of reducing temperature differences. For this purpose, the melt temperature homogenization device may be equipped with the characteristics or components described here with regard to the execution of the reducing step. Further possible configurations will be described below.

The melt temperature homogenization device may be designed as a mixer for mixing fractions of the plastics melt which are at different temperatures. The different temperatures are in particular associated with different positions in the cross section of the plastics melt, that is to say with different radial positions (and corresponding different spacings to the longitudinal axis). The melt temperature homogenization device is designed to mix said fractions at different positions in the cross section or with different spacings to the longitudinal axis. In this way, and in particular by way of the design of the extrusion apparatus, the temperature difference is reduced, and can in particular be adjusted to a maximum temperature difference of no greater than 8° C., 5° C., 2° C.

or less. Before corresponding embodiments are discussed in more detail, a further possibility that may be combined with the above approach (that is to say mechanical mixing) will be described in general terms.

The melt temperature homogenization device may be designed as a temperature control device which can release and/or absorb heat in order to assist the desired reduction of the maximum temperature difference. The temperature control device is designed to supply a different amount of heat to, or extract a different amount of heat from, fractions of the plastics melt which are situated relatively close to the longitudinal axis of the extruder screw apparatus (or of the respective extruder) than fractions situated further remote from the longitudinal axis. The temperature control apparatus may be provided as a cooling apparatus and/or heating apparatus. This may for example be provided on the extruder screw apparatus, on a casing of an extruder and/or on a melt line, or may be connected in heat-transmitting fashion thereto. The melt temperature homogenization device may in particular be designed in the manner of the components described here in the context of the temperature control step. The melt temperature homogenization device may in particular be designed for performing the abovementioned temperature control step.

Furthermore, an embodiment of the extrusion apparatus is described which is based on the abovementioned principle of the abovementioned mixer. Here, the melt temperature homogenization device comprises the extruder screw apparatus which is designed for mixing plastics melt present at different radial positions in the cross section of the homogenization zone. The extruder screw apparatus is provided in the first extruder. Alternatively, the extruder screw apparatus may be provided in a connecting extruder which connects the first extruder to the second extruder or may be provided in the second extruder and/or in an end section, which has the outlet nozzle, of the second extruder. A second extruder which comprises the outlet nozzle also refers to an extruder, preferably immediately downstream of which there is positioned a mixer as a separate assembly, which mixer is followed by the outlet nozzle. The mixer and the outlet nozzle may be regarded as the end section of the second extruder. Furthermore, the extruder screw apparatus may be provided both in the first extruder and in the connecting extruder and in the end section of the second extruder.

A preferred embodiment provides that the extruder screw apparatus comprises multiple screw spindles. These are distributed coaxially with respect to the longitudinal axis of the extruder screw apparatus, in particular circumferentially around the longitudinal axis of the extruder screw apparatus. The extruder screw apparatus and the screw spindles lie concentrically with respect to one another. The multiple screw spindles are oriented coaxially with respect to the longitudinal axis of the extruder screw apparatus. The screw spindles have envelope curves which do not overlap. The screw spindles are recessed in recesses of the extruder screw apparatus. Between the screw spindles in the circumferential direction of the extruder screw apparatus, there are provided sections which are formed with screw structures. Adjacent to the screw spindles, said sections, come into contact with, and mix, the plastics melt. The extruder screw apparatus described here may comprise a guide body which has recesses in which the screw spindles are partially recessed. The extruder screw apparatus or the first and/or second extruder and/or the connecting extruder may be designed as has already been described above. In particular, as already mentioned, use may be made of an embodiment as per document WO03/033240 A1. Furthermore, the mixer may have a section with a cross section which is narrowed (over a length section), for example as described above, such that the conducting of the melt through the narrowed cross section already yields desired mixing which leads to the intense reduction of the temperature difference.

In one embodiment, the screw spindles of the extruder screw apparatus (or of the extruder screw apparatuses) extend parallel to the longitudinal axis of the respective extruder screw apparatus, and are in particular distributed coaxially around the longitudinal axis of the extruder screw apparatus, preferably equidistantly. The screw spindles are mounted rotatably in the extruder screw apparatus and are driven, in particular jointly. The screw spindles are driven in rotation separately from the extruder screw apparatus, wherein in particular, the rotational speed of the extruder screw apparatus is controlled or regulated separately from the rotational speed of the screw spindles. The screw spindles rotate in each case about their own axis. Furthermore, the axes of the screw spindles rotate jointly about the axis of the respective extruder screw apparatus. The extruder screw apparatus or extruder screw apparatuses (of the multiple extruders) likewise rotate(s) about its or their longitudinal axis. The screw spindles are distributed circumferentially around said longitudinal axis, in particular with a constant circumferential spacing to one another. Said spacing gives rise to sections on the circumferential surface of the extruder screw apparatus which, like the screw spindles themselves, physically interact with the plastics melt, in particular by way of direct contact. The screw spindles have envelope curves which closely surround the outside of the screw spindles and which are of circular cylindrical form.

It is furthermore provided that the screw spindles of the extruder screw apparatus or of the extruder screw apparatuses rotate within said envelope curves, and said envelope curves do not overlap. The screw spindles rotate at least partially in recessed fashion in the respective extruder screw apparatus. The envelope curve of the extruder screw apparatus as a whole is preferably substantially circular. The extruder screw apparatus has recesses in which the screw spindles are recessed. The recesses extend, in cross section, over an angular segment which is less than a full circle, and which amounts in particular to more than 180°, preferably no more than 330°, no more than 300°, or no more than 270°. The screw spindles are thus not covered by the extruder screw apparatus over an angle of greater than 0°, no greater than 180°, and preferably of approximately 30°-90° on the circumferential surface of the extruder screw apparatus.

It may furthermore be provided that the screw spindles rotate in envelope curves which do not overlap, and between the screw spindles, sections are provided on the circumferential surface of the extruder screw apparatus. Said sections have structures which project into the plastics melt, for example circular arc-shaped grooves or continuous or interrupted screw thread sections. By means of said structures of the sections, the plastics melt is conveyed and/or mixed, and/or pressure is built up in the plastics melt.

A further aspect is the (additional) supply or discharge of heat in order to control the temperature of the plastics melt and in order to reduce temperature differences within the cross section of the plastics melt. It is provided that temperature differences between fractions of the plastics melt at different radial positions in the cross section of the plastics melt are reduced through temperature control of the plastics melt, in particular by cooling the plastics melt within the second extruder. The temperature control is performed by way of an exchange of heat between the plastics melt, on the one hand, and the casing of the first extruder and/or a casing of the second extruder (or of the connecting extruder or a wall of the melt line), on the other hand. Furthermore, it may be provided that heat between the plastics melt, on the one hand, and an extruder screw apparatus, which generates or conveys the plastics melt in the first and/or second extruder and/or in the optional connecting extruder, on the other hand, is exchanged.

Furthermore, the mixer, and in particular a further mixer, may be formed in the melt line. Said melt line is provided between the first and the second extruder. In particular, the melt line leads from the first extruder to the second extruder. As a result of being conducted through the melt line, fractions of the plastics melt situated at different cross-sectional positions or at different distances from a center line of the cross sections of the plastics melt are mixed with one another, giving rise to the desired reduction of the temperature differences over the cross section. The first extruder may be equipped with the extruder screw apparatus. Any temperature differences present in the plastics melt discharged from the first extruder are reduced by the melt line, which is equipped with the mixer.

Furthermore, the mixer may be formed between the second extruder and the outlet nozzle. Here, thermal mixing is achieved only by way of an adequately long and small mixer arrangement. If the length of the mixing region is too short, it is duly possible for "mechanical" mixing (in the sense of physical mixing of fractions of the plastics melt) to be realized, that is to say for example for additives to be better mixed in the melt, but thermal homogenization cannot take place. If the mixer is for example a static mixer with cross elements, a length of the elements of approximately four times the diameter of the extruder interior is adequate for mechanical mixing, but it is only above a length corresponding to approximately six times the diameter that thermal homogenization takes place. Since the pressure drop over such a length is significant, previous solutions have, already in the case of a length corresponding to four times the diameter, resorted to an increase in the diameter in relation to the upstream extruder; for example, in the case of an extruder diameter of 150 mm, a diameter of 200 mm was used for the mixer. An increase in the pressure by way of a melt pump has long been prior art, but is no longer used owing to the temperature peaks that have been observed. An additional problem is that the shear velocity drastically decreases within the mixing element. Thus, the plastics melt stiffens owing to the plastics-specific material behavior, in such a way that the opposite effect arises; specifically, despite an increased mixer diameter, it is now the case that more pressure is consumed than in the case of a relatively small diameter. With the arrangement described here, despite the associated pressure losses, it is possible to use mixer diameters equal to or smaller than the extruder diameter, with a length which corresponds to, or is longer than, approximately six times the diameter of the extruder.

As already mentioned, the melt temperature homogenization device may have a temperature control apparatus. Said temperature control apparatus may be provided in a casing section or in the extruder screw apparatus of at least one of the extruders. The temperature control apparatus may, as already mentioned, be provided in the form of a heating device, a cooling device, a combination of these, and/or as a heat exchanger arrangement. The extrusion apparatus may furthermore have a heat source or heat sink which is connected to the heat exchanger arrangement, in particular via a heat medium circuit, which may likewise be a constituent part of the extrusion apparatus. The temperature control apparatus may be provided on the first extruder, on the second extruder or on the connecting extruder, or else on the melt line, in order, if appropriate, to assist mechanical mixing, which leads to the reduction of the temperature differences, by way of a supply or discharge of heat. The two stated general possibilities for the design of the homogenization device may thus be combined.

According to a further aspect, the extrusion apparatus furthermore has a foaming agent source. This may be connected to the interior of the first extruder, to a melt line between the first and the second extruder, or to the interior of the connecting extruder. As already noted, the connecting extruder connects the first extruder to the second extruder, either directly or via at least one further melt line and/or other components, which conduct plastics melt, of the extrusion apparatus. The foaming agent source may be connected via a feed of at least one of the stated components. Furthermore, the extrusion apparatus may have a vessel with at least one additive such as has been described here, and/or a vessel with plastics granulate, plastics, or starting materials, from which plastics are generated in the first extruder.

The extrusion apparatus may furthermore comprise a drive for the extruder screw apparatuses of the first and of the second extruder. The extrusion apparatus preferably comprises a drive for the first extruder and a drive for the second extruder, which drives are not directly connected in motion-transmitting fashion, but rather can be operated individually. In this way, the first extruder can thus be controlled so as to yield a desired plastics melt with a small maximum temperature difference over the cross section, and the second extruder can be controlled so as to generate a desired pressure at the outlet nozzle. In particular, the second extruder is controlled, or equipped with a temperature control apparatus, such that no significant temperature differences arise in the second extruder. The second extruder is in this case designed such that the pressure upstream of the extruder is determined only by way of the rotational speed of the extruder, but not by the pressure at the outlet nozzle, such that it is made possible to compensate for pressure losses by way of the homogenizing apparatuses or mixers. If the extruder screw apparatus comprises multiple screw spindles, it is possible, for the drive of the screw spindles, to provide a drive which is independent of the drive of the extruder screw apparatus for the rotation thereof about its longitudinal axis.

The extrusion apparatus comprises a control device which is equipped for carrying out the method by setting operating variables of the first extruder, of the second extruder and, if appropriate, of the connecting extruder in accordance with the method. In particular, the control device sets the rotational speed (or drive power) of the first extruder and/or of the second extruder, and if appropriate also the rotational speed (or drive power) of the connecting extruder and/or of the screw spindles. Furthermore, the control apparatus may be designed to control the stated temperature control apparatus in the discussed manner according to the invention, for example in order to generate a desired level of refrigeration or heat power which is imparted to the plastics melt. The control apparatus may have an input at which temperature signals are received, which temperature signals represent at least one temperature of the plastics melt and/or of a casing of one of the extruders, preferably at least two temperatures which are characteristic of the temperatures of fractions of the plastics melt at different cross-sectional positions of the plastics melt. The control apparatus may have a regulating unit which is connected to the input in order to minimize the temperature differences in accordance with the method (wherein this is the aim of the regulation of the regulating unit). The control variables of the regulating unit are in particular the variables set by the control apparatus, or are variables linked thereto.

DETAILED DESCRIPTION OF THE PREFERRED EMBODIMENTS

Figure 1:
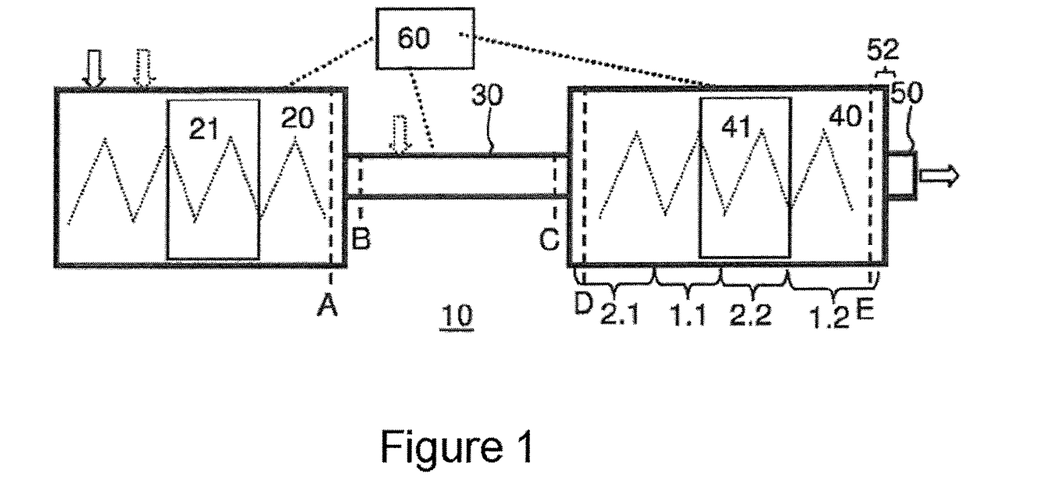
FIG. 1 is a symbolic illustration of a layout schematic of an apparatus according to the invention, for explanation of the method according to the invention.

FIG. 1 is a symbolic illustration of a layout schematic of an apparatus according to an aspect of the invention. A method according to an aspect of the invention can be explained on the basis of FIG. 1. The extrusion apparatus 10 illustrated in FIG. 1 comprises a first extruder 20, a connection 30 which conducts plastics melt of the first extruder 20 to a second extruder 40, and an outlet nozzle 50 at the end of the second extruder 40. The outlet nozzle is connected via a connection 52 (merely symbolically illustrated) to the rest of the extruder, which connection may in particular comprise a mixer. The connection 52 and the outlet nozzle 50 may be regarded as the end section of the second extruder. In specific embodiments, the connection has a further extruder screw apparatus which may be designed as described here, and which can be driven and/or controlled separately in relation to an extruder screw apparatus of the rest of the second extruder (that is to say of the second extruder positioned upstream of the end section). In this case, the mixer is in the form of a continuous mixer, and is in particular formed with a dedicated extruder screw apparatus, which is driven.

The first and second extruders 20, 40 each have extruder screw apparatuses which are depicted symbolically as dotted zigzag lines. The extrusion apparatus 10, which comprises multiple extruders and which can be regarded as an extruder installation, is furthermore equipped with a control apparatus 60, which is in particular connected to, such that it can control, the first and the second extruder 20, 40. It can be seen from FIG. 1 that, here, individual control connections are provided (as connections illustrated in the form of dotted lines). This illustrates that the control apparatus 60 can control the first extruder 20 and the second extruder 40 separately from one another. The arrow leading away from the outlet nozzle indicates the conveying direction of the plastics melt which, after it has passed or as it passes through the outlet nozzle 50, expands to form a foamed body. The downwardly pointing vertical arrows indicate feeds. The arrow illustrated with a solid line represents a feed of plastics granulate. The arrows illustrated with dotted lines represent feeds of foaming agent and/or of at least one additive. The arrow directed toward the first extruder 20 and illustrated with a dotted line may be a feed of an additive. The arrow directed toward the connection 30 and illustrated with a dotted line may be a feed of foaming agent. The arrows illustrated with dotted lines each represent an optional feed. The feed 30 is for example realized as a connecting extruder or as a melt line, or may also be realized as a direct transition between the first and the second extruder 20, 40.

The second extruder has first length sections 1.1 and 1.2 and second length sections 2.1 and 2.2. Said length sections 1.1-2.2 are arranged in direct succession. Furthermore, the length sections 1.1-2.2 extend over the entire length of the second extruder and, in particular, extend as far as the outlet nozzle 50. The first length sections 1.1 and 1.2 alternate in each case with the second length sections (in the longitudinal direction of the illustrated apparatus). The first length sections 1.1 and 1.2 are designed to convey and to mix the plastics melt. The second length sections 2.1 and 2.2 are designed to convey the plastics melt and to thereby increase the pressure of the plastics melt. It is however also possible for the first length sections 1.1 and 1.2 to be designed to increase the pressure (albeit in particular by a lower pressure than the second length sections). Extending directly upstream of the outlet nozzle 50 (in the conveying direction) is the second and thus final first length section, which is designed inter alia for mixing purposes. In this way, plastics melt which has been mixed and thus thermally homogenized is fed to the outlet nozzle 50. The second length section 2.2 generates the required pressure in the plastics melt in order for the latter to be fed to the first length section 1.2, wherein the generated pressure is high enough that, despite a pressure drop across the first length section 1.2, the plastics melt is pressed through the outlet nozzle 50 with adequate pressure. Since a first and a second length section alternate also upstream of said first length section 1.2, both the pressure and the degree of mixing are adequate for a desired minimum throughput through the outlet nozzle 50 and adequate for a homogeneous temperature distribution in the melt at the outlet through the outlet nozzle 50. At least one, preferably two or more than two first length sections are provided in the second extruder. Furthermore, at least one, preferably two or more than two first length sections are provided in the second extruder. It is for example possible, in the second extruder, for only one second length section to be provided, which is followed (preferably directly) by a first length section (of the second extruder) and which is preceded, preferably directly, by a further first length section (of the second extruder).

With regard to the designation of the length sections, it is to be noted that, in the context of the length sections, "first" and "second" define not the sequence but the assignment of characteristics: first length sections have the function of mixing, and second length sections have the function of increasing the pressure in the plastics melt. Both length section types have the characteristic of conveying the plastics melt, albeit with a different build-up of pressure. It is to be noted that connecting extruders, or the first extruder, may also have first and/or second length sections in any desired number.

A plastics melt is generated in the first extruder. For this purpose, the first extruder may have a heating device 21. At the end of the first extruder 20, a cross section A of the plastics melt is realized which may have an inhomogeneous temperature distribution. By use of a melt line as a connection 30, or else by way of a direct transition between the extruders 20 and 40 (which may be associated with an intense narrowing of the plastics melt cross-sectional area or else with a change in direction of the plastics melt flow), the inhomogeneous temperature distribution is reduced. This gives rise to a cross section B, directly downstream of the first extruder in the connection 30 of the plastics melt, with a reduced maximum temperature difference. If the connection 30 is formed by a connecting extruder, which may in particular have the characteristics of a mixing extruder, this gives rise, at the cross section C, which lies at the end of the connecting extruder or which is connected directly to the second extruder, whose maximum temperature difference is smaller than at the cross section C which lies at the opposite end of the connection. At the cross section D in the second extruder 40, which directly follows the connection 30, a small maximum temperature difference prevails which corresponds to, or is less than, that of cross section C, since a transition from the connection 30 to the second extruder may likewise be associated with a change in direction or change in cross-sectional area of the plastics melt flow, which leads to further mixing of fractions of the plastics melt which are at different temperatures. At the cross section E, which lies directly upstream of the outlet nozzle 50, a maximum temperature difference exists which substantially corresponds to the temperature difference in the cross section D, or lower. The second extruder may have a temperature control apparatus 41, in particular a cooling apparatus, for cooling the plastics melt. The apparatuses 21 and 41 may generally be temperature control apparatuses which are designed for cooling and/or for heating the plastics melt. Said temperature control apparatuses 21 and 41 serve for increasing, adjusting or reducing the plastics melt temperature in the first and/or second extruder 20, 40, and are in particular designed for cooling fractions of plastics melt that are at a higher temperature than other fractions, and/or for heating fractions of the plastics melt that are at a lower temperature than other fractions, in order to reduce the temperature difference. Since, in particular, the temperature difference does not merely differ generally over the cross section but is in particular different at different radial positions, the temperature control apparatuses 21 and 41 may be used for cooling or heating fractions of the plastics melt at the casing of the extruder or at the extruder screw apparatus of the extruder more intensely than fractions at other points of the cross section. The plastics melt which is fed to the outlet nozzle 50 exhibits only a small maximum temperature difference, such that the solidification process, which may overlap with the expansion process, takes place substantially equally (rapidly) over the entire cross section of the solidifying plastics melt. This results in a substantially uniform cell structure over the cross section of the plastics body (=solidified plastics melt), in particular with regard to the cell size, the cell density and/or the wall thickness between the cells. The temperature control apparatus 21 of the first extruder 20 is for example designed to heat the plastics melt to a temperature of 150-290° C. (depending on the plastics material used), wherein the temperature control apparatus 21 (or the control apparatus) may be equipped with a regulator in order to set the plastics melt to a desired temperature. The first and/or the second extruder 20, 40 or else the connection 30 may be equipped with a (at least one) temperature sensor for detecting the temperature of the plastics melt. Said temperature sensor is connected to the regulator or the control apparatus in order to provide a corresponding temperature signal to the regulator.

Figure 2:
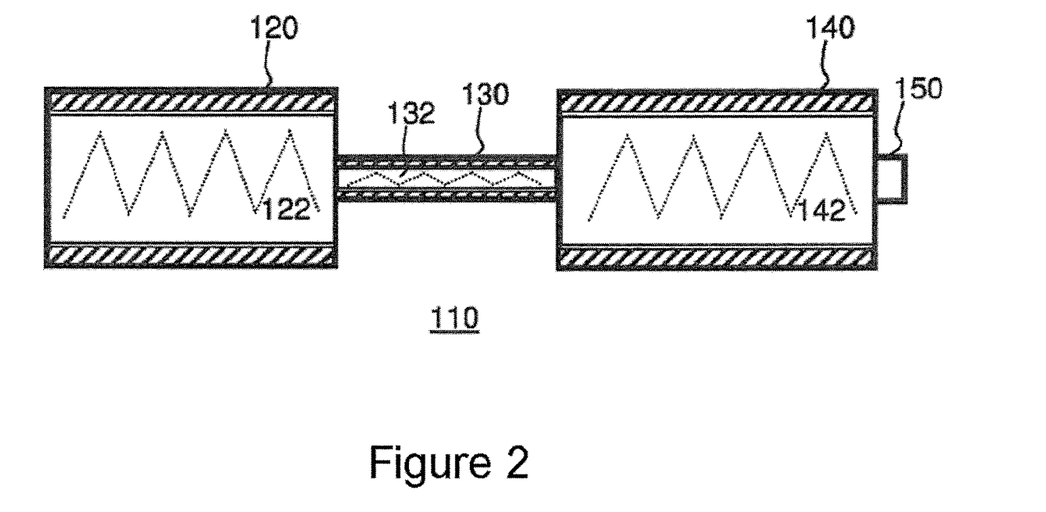
FIG. 2 is a symbolic illustration of a layout schematic of an embodiment of the apparatus according to the invention, for explanation of the method according to the invention.

FIG. 2 is a symbolic illustration of a layout schematic of an embodiment of the apparatus 110 according to the invention, for explanation of the method according to the invention. A first extruder 120 is equipped with an extruder screw apparatus 122. Positioned (directly) downstream of the first extruder 120 is a connecting extruder 130, which likewise has an extruder screw apparatus 132. The connecting extruder 130 is followed (directly) by a second extruder 140, which likewise has an extruder screw apparatus 142. The extruder screw apparatus 122 and the extruder screw apparatus 142 of the first and second extruders 120, 140 may be individually controlled. This likewise applies to the extruder screw apparatus 132 in relation to the extruder screw apparatuses 122 and 142. The second extruder 140 has an outlet nozzle 150. Through this, the extruder screw apparatuses 142 convey plastics melt with a homogeneous temperature distribution, because in particular, the connecting extruder 130 mixes the plastics melt over the cross section.

The first extruder generates a plastics melt, whose temperature differences over the cross section—if present—are reduced by the connecting extruder. The connecting extruder 130 furthermore serves for building up pressure, whereby the first extruder 120 may in particular have a mixing function, and the pressure loss resulting from this can be compensated by the connecting extruder 130 and in particular by the second extruder 140. Also, the connecting extruder 130 may serve primarily as a mixing extruder, wherein the pressure loss associated therewith can likewise be compensated by the second extruder 140. The plastics melt may therefore be at a lower pressure at the outlet of the first extruder and/or of the connecting extruder than at the outlet nozzle 150 of the second extruder.

The second extruder may thus be used primarily for building up pressure, because it receives from the connecting extruder plastics melt that has already been thermally homogenized over the cross section. Furthermore, in the second extruder, the plastics melt can be cooled, whereas the first extruder serves for heating (and generating) the plastics melt. The connecting extruder 130 in particular may be designed as a mixing extruder with high surface renewal, in particular with surface renewal higher than that of the second extruder (which serves primarily for building up pressure). The first extruder 120 may also be designed, like the connecting extruder 130, as a mixing extruder with high surface renewal, in particular with surface renewal higher (for example by a factor of at least 1.5, 2, 5, preferably 8 or 10) than that of the second extruder 140. For this purpose, the extruder provided as mixing extruder may have an extruder screw apparatus 132 and/or 142 with multiple screw spindles, as described herein. In addition to or in combination with this, the extruder provided as mixing extruder may have an extruder screw apparatus 132 and/or 142, the screw thread of which is interrupted, in particular over at least 30%, 50%, 80% or 90% of the overall length of the extruder screw apparatus. This duly gives rise to a lower pressure (wherein this is compensated by the second extruder), but this leads to intense mixing of the plastics melt in said extruder or in said extruders. The second extruder 140 preferably has an extruder screw apparatus 142 whose screw thread is not interrupted (or is interrupted only at transition sections).

Figure 3:
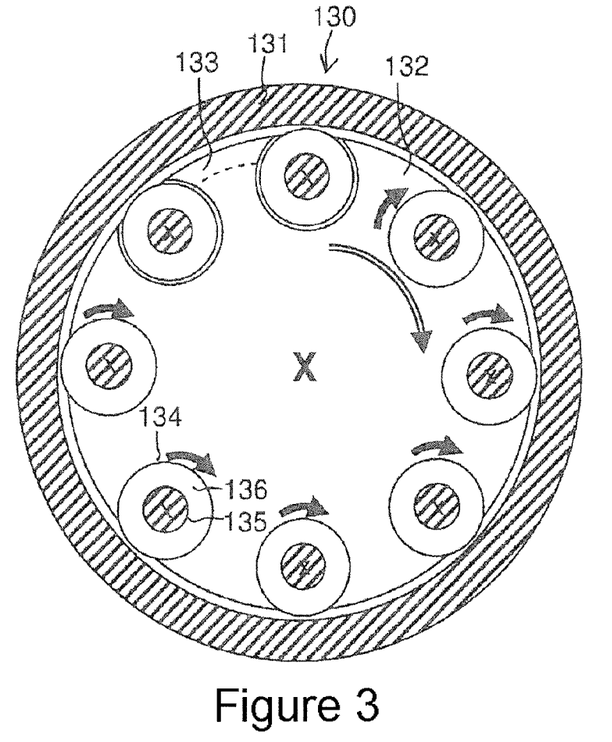
FIG. 3 shows a cross section through one of the extruders.

FIG. 3 shows an exemplary extruder 130 in cross section. Said extruder corresponds, in this example, to the connecting extruder 130 of FIG. 2, though may correspond to the first extruder and/or also, if appropriate, to the second extruder. For this reason, in the context of the description of FIG. 3, the illustrated article will be referred to generally as extruder 130 (and not as connecting extruder 130), and is generally representative of the first, the second and/or the connecting extruder.

The extruder 130 of FIG. 3 comprises a (hollow cylindrical) casing 131 of circular cross section, in which the extruder screw apparatus 132 is situated. Said extruder screw apparatus has circumferentially distributed screw spindles 134. The screw spindles 134 (of which, for better clarity, only one is denoted by a reference sign) are arranged with uniform angular spacings to one another. The screw spindles 134 surround the longitudinal axis of the extruder screw apparatus 132 coaxially, wherein the longitudinal axis of the extruder screw apparatus 132 is illustrated as a cross in the center of FIG. 3. In particular, the individual longitudinal axes of the screw spindles 134 (likewise denoted by a cross) are parallel to the longitudinal axis of the extruder screw apparatus 132. The screw spindles, and in particular the longitudinal axes thereof, are arranged along a circle, in the center of which the extruder screw apparatus 132, or the longitudinal axis thereof, is situated. The screw spindles 134 have envelope curves which do not overlap. The envelope curves represent the outer edge of the screw thread 136 of the screw spindles 134. The screw threads 136 are mounted on a circular cylindrical solid body 135.

The screw spindles 134 are recessed in recesses of the extruder screw apparatus 132. Between the screw spindles in the circumferential direction of the extruder screw apparatus there are provided sections 133 which are formed with thread structures. Said sections are provided between all adjacent screw spindles. The dashed line represents the transition to the thread flights of the thread structures. In FIG. 3, for better clarity, only one section 133 is denoted by a reference sign. The extruder screw apparatus 132 comprises comprise a guide body which has recesses in which the screw spindles are recessed. The recesses do not extend over the entire length of the extruder screw apparatus 132, in order for bearings for the screw spindles 134 to be provided on the longitudinal ends of the screw spindles 134. The guide body thus extends beyond the extruder screw apparatus 132 in the longitudinal direction. The arrows illustrated with a single line represent the movement of the screw spindles 134 about their respective longitudinal axis. The arrows illustrated with a double line represent the rotational movement of the extruder screw apparatus 132 or of the guide bodies thereof around the longitudinal axis of the extruder screw apparatus. The movement of the screw spindles 134 is preferably independent of the movement of the extruder screw apparatus 132. In particular, independently controllable drives or independent drive sections may be provided which are connected to the screw spindles 134, on the one hand, and to the extruder screw apparatus (or to the guide body), on the other hand, and which permit individual movement or individual drive control. The screw spindles 134 may, for drive purposes, be connected to one another, and in particular driven jointly. Such a common drive of the screw spindles 134, on the one hand, and the drive of the extruder screw apparatus (for rotation of the extruder screw apparatus about its longitudinal axis), on the other hand, are independent of one another. Alternatively, the common drive and the drive of the extruder screw apparatus, for rotation of the extruder screw apparatus about its longitudinal axis, may be coupled to one another.

The dashed regions of FIG. 3, and the region within the dashed line, is preferably a solid body. Thread flights respectively extend in each case radially outward proceeding from the dashed region 135 of the screw spindles 134 and proceeding from the dashed line of the extruder screw apparatus 132. Said thread flights are preferably substantially continuous. Alternatively, the region 133 may have a thread flight with a pitch of zero as a radially outwardly directed structure, that is to say a circumferentially running elevation.

As already mentioned, an embodiment as per document WO03/033240 A1 may be used for the extruder screw apparatus. The extruder screw apparatus may in particular be designed in the manner of the multi-screw extruder part of WO03/033240 A1, for example with regard to the design and arrangement of the screw spindles of the extruder screw apparatus. The extruder screw apparatus may furthermore have extruder screws, as presented in WO03/033240 A1, which are arranged as an elongation of the arrangement shown in FIG. 3, as is also illustrated in WO03/033240 A1.

Figure 4:
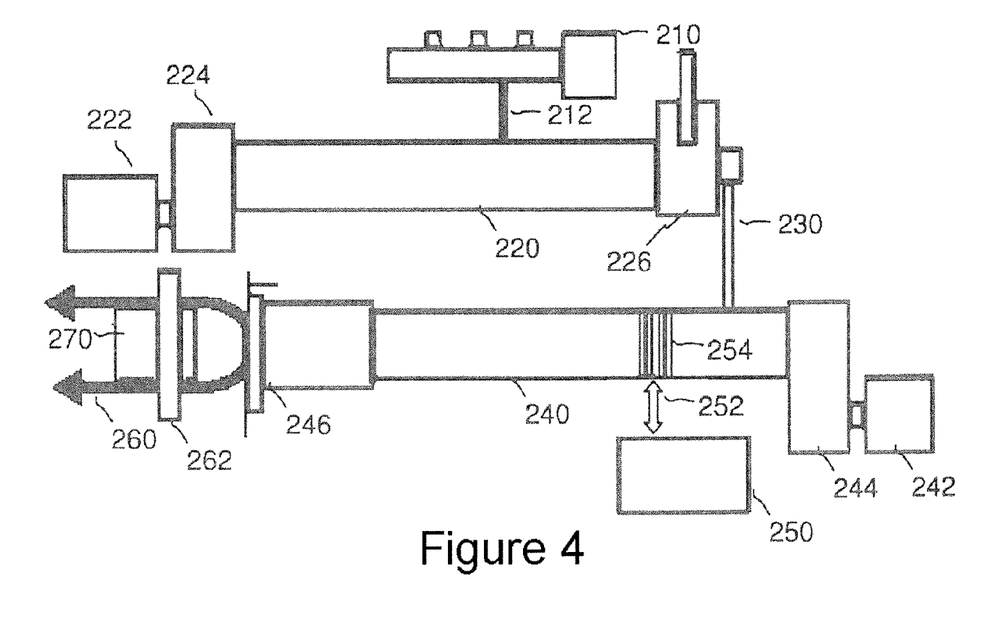
FIG. 4 is a symbolic illustration of a layout schematic of a further embodiment of the device according to the invention, for explanation of the method according to the invention.

FIG. 4 is a symbolic illustration of a layout schematic of a further embodiment of the apparatus according to the invention, for explanation of the method according to the invention. The extrusion apparatus illustrated in FIG. 4 comprises a preparation or provision element 210 for the feed 212 of plastics granulate and/or additives or else of foaming agent into a first extruder 220. The latter is equipped with a drive 222 which drives an extruder screw apparatus via a coupling 224. The drive 222 and the coupling 224 of the first extruder 220 are provided on one end of the extruder 220. On the opposite end, there is provided a filter 226 and/or a matrix which is designed for mixing the plastics melt. In this way, a certain degree of temperature homogenization over the cross section of the plastics melt is achieved. The first extruder 220 discharges plastics melt via the filter 226 to a melt line 230 which connects the first extruder to a second extruder 240. In the melt line, too, and/or as a result of the transition to the melt line 230 and at the transition out of the latter, the plastics melt is mixed once again, in particular owing to a change in cross section or change in direction of the plastics melt at the transition between the melt line and the extruder. This, too, gives rise to temperature homogenization over the cross section of the plastics melt.

The second extruder 240 has a drive 242 which, via a corresponding coupling 244, drives an extruder screw apparatus in the second extruder. The drive 242 and the drive 222 are separate from one another and can be controlled independently of one another. The filter 226 and the melt line 230 duly give rise to mixing of the plastics melt which leads to temperature homogenization over the cross section of the plastics melt. However, this is associated with a pressure loss, wherein the second extruder increases the pressure of the plastics melt in relation to the pressure in the melt line 230 or in the first extruder 220, in particular to a pressure which is desired at the outlet nozzle 246 of the second extruder. The second extruder is cooled by way of a cooling apparatus 250 of the extrusion apparatus illustrated in FIG. 4, wherein heat is transmitted via the heat-transmitting connection 252 between cooling apparatus 250 and second extruder 254. The cooling apparatus 250 is connected to the casing of the second extruder. The cooling apparatus 250 cools the plastics melt within the second extruder from the side of the casing. For this purpose, the casing has cooling ducts 254 which may also be formed in a cooling sleeve. The heat-transmitting connection 254 is in particular a heat medium circuit.

The second extruder 240 has an end to which the melt line 230 is connected and at which, in particular, the drive 242 or the coupling 244 is situated. The outlet nozzle 246 is provided at the end opposite this. Said outlet nozzle is a circular-slot nozzle with a preferably circular slot through which the foamed and at least partially solidified plastics mass 260 is discharged, see arrows. Positioned downstream of the outlet nozzle 246 are optional aftertreatment components such as a cooling ring 262 and a pulling-open mandrel 270, between which the at least partially solidified plastics mass 260 is conveyed. The at least partially solidified plastics mass 260 obtained in this way forms a hollow cylindrical foam body, which may subsequently also be cut open longitudinally in order to form a flat foamed plastics foil as a foamed body. Subsequently, said foil may also be wound up and stored for example for post-expansion and, if appropriate, for thermoforming steps.

The second extruder is preferably equipped with an extruder screw apparatus which has continuous thread flights for building up the pressure for the outlet nozzle 246. Said thread flights are spaced apart from the inner side of the casing of the first extruder merely by way of a gap, such that plastics melt must pass through said gap during the conveying movement and, in this way too, is mixed (and can in particular be subjected to temperature control by way of the casing of the second extruder). Preferably, the second extruder (and in particular the extruder screw apparatus thereof) is of long form, that is to say has a length-to-diameter ratio of at least 4 or 5 and preferably of at least 6, 7 or greater.

It is also to be noted that the extruder screw apparatuses mentioned here may be constructed as illustrated in FIG. 3, in particular with multiple circumferentially distributed screw spindles. Instead, at least one of the extruder screw apparatuses mentioned here may be constructed in the manner of the screw of a single-screw extruder with an inner cylindrical screw body and with thread flights coiled helically around said screw body. Unless described otherwise, the extruder used may be a single-screw or twin-screw extruder.

The invention claimed is:

1. An extrusion apparatus for producing a foamed body, the extrusion apparatus comprising:
   a first extruder having a first drive for driving the first extruder and an introduction region which has an introduction duct designed for a feed of plastics particles;
   a second extruder having a second drive for driving the second extruder and an outlet region which has an outlet nozzle, the second drive operable independently from the first drive;
   wherein the first and/or the second extruder comprise(s) an extruder screw apparatus which has multiple screw spindles which are distributed circumferentially around the extruder screw apparatus and which are respectively positioned at least partially in multiple recesses extending along a length of the extruder screw apparatus within an outer radial surface of a guide body of the extruder screw apparatus and which are mounted so as to be rotatable within the recesses within the guide body of the extruder screw apparatus, and thus, the extruder screw apparatus is designed to reduce temperature differences between different radial positions in a cross section of plastics melt, and to conduct the plastics melt that has been thermally homogenized through the outlet nozzle.

2. The extrusion apparatus as claimed in claim 1, wherein the extruder screw apparatus of the second extruder, the extruder screw apparatus of the first extruder, an extruder screw apparatus of a connecting extruder between the first and the second extruder, or an extruder screw apparatus of an end section, which has the outlet nozzle, of the second extruder comprises respective multiple respective screw spindles which are distributed circumferentially about the extruder screw apparatus, wherein the screw spindles of the extruder screw apparatus or of the extruder screw apparatuses have envelope curves and are spaced apart by sections on a circumferential surface of the extruder screw apparatus, which the sections are designed for conveying and/or mixing the plastics melt and/or for building up pressure in the plastics melt.

3. The extrusion apparatus as claimed in claim 1, wherein the first extruder is connected to the second extruder via a melt line, and in the melt line, there are provided mixing elements which are designed for mixing fractions of the plastics melt which are present at different radial positions in the cross section of the plastics melt, and/or the melt line has a temperature control apparatus which absorbs heat from or supplies heat to the plastics melt situated in the melt line.

4. The extrusion apparatus as claimed in claim 2, wherein the first extruder is connected to the second extruder via a melt line, and in the melt line, there are provided mixing elements which are designed for mixing fractions of the plastics melt which are present at different radial positions in the cross section of the plastics melt, and/or the melt line has a temperature control apparatus which absorbs heat from or supplies heat to the plastics melt situated in the melt line.

5. The extrusion apparatus as claimed in claim 1, wherein the multiple screw spindles are mounted so as to be rotatable within the extruder screw apparatus around a longitudinal axis of the extruder screw apparatus.

\* \* \* \* \*